US012765972B2

(12) United States Patent
Murphy

(10) Patent No.: US 12,765,972 B2
(45) Date of Patent: Oct. 20, 2026

(54) VERTICAL PIVOT DEVICE

(71) Applicant: Dean J Murphy, Rockford, IL (US)

(72) Inventor: Dean J Murphy, Rockford, IL (US)

( * ) Notice: Subject to any disclaimer, the term of this patent is extended or adjusted under 35 U.S.C. 154(b) by 57 days.

(21) Appl. No.: 18/831,031

(22) Filed: May 7, 2024

(65) Prior Publication Data

US 2024/0374354 A1 Nov. 14, 2024

Related U.S. Application Data

(60) Provisional application No. 63/577,689, filed on May 11, 2023.

(51) Int. Cl.
*A61C 7/36* (2006.01)
*A61C 7/20* (2006.01)

(52) U.S. Cl.
CPC . *A61C 7/36* (2013.01); *A61C 7/20* (2013.01)

(58) Field of Classification Search
CPC .......... A61C 7/36
See application file for complete search history.

(56) References Cited

U.S. PATENT DOCUMENTS 5,151,027 A * 9/1992 Mann .......... A61D 5/00 433/1
5,306,142 A * 4/1994 Richards .......... A61C 7/00 433/17
11,246,682 B1 * 2/2022 Jolley .......... A61C 7/36
12,213,907 B2 * 2/2025 Radmand .......... A61F 5/566
2005/0032016 A1 * 2/2005 Bloore .......... A61C 7/02 433/15
2010/0151402 A1 * 6/2010 Williams .......... A61C 7/00 433/7
2015/0064651 A1 * 3/2015 Zhang .......... A61F 5/566 128/848
2021/0205119 A1 * 7/2021 De Clerck .......... A61F 5/566

FOREIGN PATENT DOCUMENTS

EP 1658823 A1 * 5/2006 .......... A61C 7/36
FR 2935261 A1 * 3/2010 .......... A61C 7/36

* cited by examiner

*Primary Examiner* — Heidi M Eide
(74) *Attorney, Agent, or Firm* — Reinhart Boerner Van Deuren P.C.

(57) ABSTRACT

In some examples, an apparatus includes an orthodontic housing enabling conversion of an appliance such as a Herbst appliance used in advancement of the mandible of a patient from a horizontal component to a vertical component. This vertical orientation allows for many advantages in the use of the appliance.

15 Claims, 7 Drawing Sheets

500

500

VERTICAL PIVOT DEVICE

CROSS-REFERENCE TO RELATED PATENT APPLICATION

This application is a continuation application of U.S. Provisional Patent Application Ser. No. 63/577,689 filed by Dean J. Murphy on May 11, 2023, the entirety of which is incorporated herein by reference thereto.

TECHNICAL FIELD

This disclosure relates generally to a device such as an appliance used in orthodontic and/or orthopedic therapy, including, for example, a device such as a Herbst appliance.

BACKGROUND

Dr. Emil Herbst (1905 Germany) designed a steel rod and tube appliance (also known as a Herbst appliance) that can be attached intraorally to teeth of a patient. This arrangement may be used to enable protrusion of a jaw, jawbone, and/or lower jawbone of the patient (for example, also referred to as the mandible of the patient). Protrusion of the mandible can encourage mandibular growth and development. It is also used to open a patients airway to improve snoring and sleep apnea. The appliance may be attached to the molar teeth and/or lower canine region using eyelets on the ends of rods and tubes. These eyelets may be connected to pivots and axles brazed or welded to the molars or canine region via stainless steel temporary crowns.

A rod and tube mechanism such as a Herbst appliance allows the patient to open and close their mouth vertically as the rod slides inside the tube. The length of the tube portion determines the degree of mandibular advancement and activation. This length is determined by a professional such as an orthodontist, and is not adjustable by the patient. The anterior position of the mandible creates biologic and physiologic adaptations that may be used to correct an overjet (overbite) of the patient and improve airway.

Different Herbst appliance assemblies may be used that involve telescoping rods and tubes. However, a consistent anterior position of the mandible is important.

U.S. Pat. No. 4,462,800 to Jones entitled "Orthodontic Bite Jumping Device" describes a flexible attachment to engage arch wires to a Herbst appliance.

U.S. Pat. No. 5,183,388 to Kumar entitled "Mobile Hinge Member and Orthodontic Appliance Using It" describes a way of connecting two ends of a Herbst appliance. Due to a horizontal attachment, the position of the appliance disclosed in Kumar restricts movement of the mandible in horizontal directions. This restriction, combined with large amounts of force that can be generated during chewing motions, often results in breakage of the appliance.

U.S. Pat. No. 5,620,321 to Thornburg et al. entitled "Orthodontic Appliance" describes a ball and socket type of attachment for a Herbst appliance. However, such a ball and socket greatly increases the cost of the appliance.

U.S. Pat. No. 6,244,862 to Hanks entitled "Orthodontic Appliance" describes using screw axles with supports.

U.S. Pat. No. 5,378,147 to Mihailowitsch entitled "Ventral Telescope", U.S. Pat. No. 5,562,445 to DeVincenzo et al. entitled "Resiliently Expandable Orthodontic Device", U.S. Pat. No. 5,738,514 to DeVincenzo et al. entitled "Resiliently Expandable Orthodontic Device", and U.S. Pat. No. 5,829,975 to Gold entitled "Orthodontic Appliance" relate to Herbst mechanisms using a three-piece telescoping arm and ball and socket attachments. Difficulties of using three-piece arms include cost of manufacturing and binding/bending due to occlusal forces, which result in bending that leads to locking of the patient's mouth.

Prior appliances do not address problems of binding and breakage while also improving the ability for early engagement of the appliance and reducing tissue impingement. These prior appliances are complicated attachment systems with high complexity and costs.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DETAILED DESCRIPTION

Figure 1:
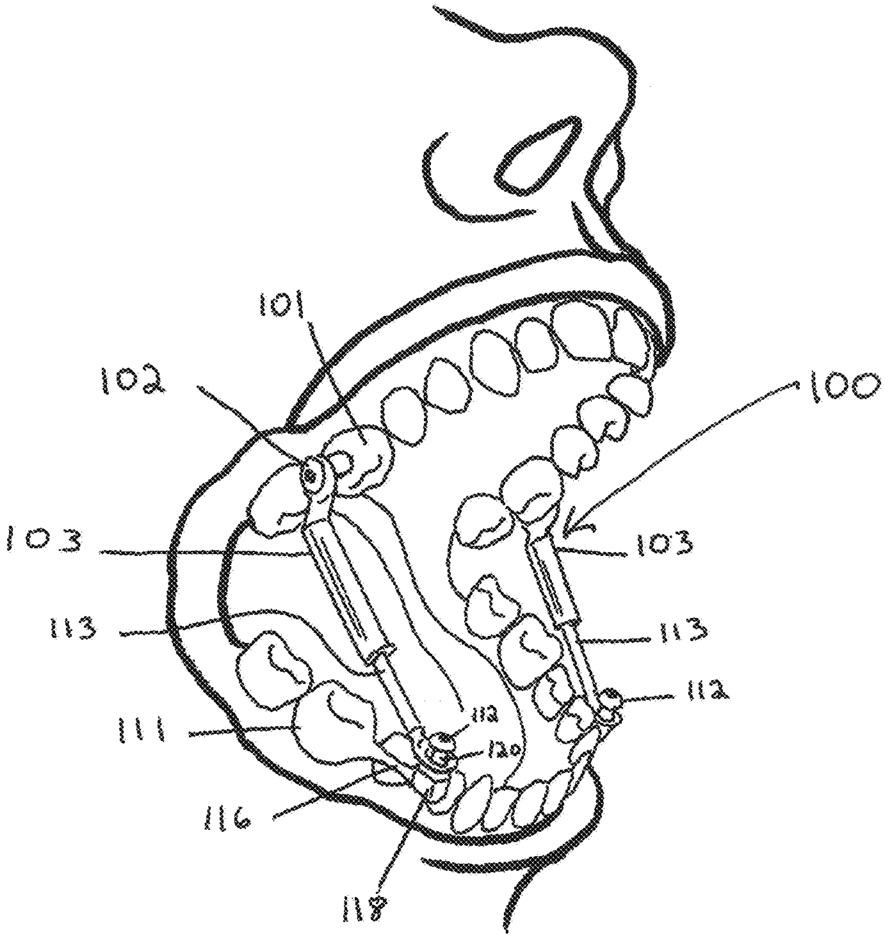
FIG. 1 illustrates an appliance in accordance with some embodiments.

In some embodiments, an orthodontic housing enables conversion of a popular appliance used in advancement of the mandible of a patient from a horizontal component to a vertical component. A vertical orientation allows many advantages in the use of the appliance.

Some embodiments relate to a vertical pivot device. Some embodiments relate to an appliance (for example, to an orthopedic appliance, to an orthodontic appliance, and/or to a Herbst appliance). Some embodiments relate to an appliance that includes a vertical pivot device. Some embodiments relate to an orthodontic appliance that includes a vertical pivot device. Some embodiments relate to a Herbst appliance that includes a vertical pivot device. Some embodiments relate to an orthopedic appliance that includes a vertical pivot device.

An appliance such as a Herbst appliance can include eyelets incorporated into one end of a rod and tube arrangement. The eyelets can be secured by screws into a soldered axle. The soldered axle can be soldered to a band or a crown. Solder joints can be laser-welded, or can also be brazed or resistance-welded. A cantilever arm may be used as an extension mesially or forward off a lower molar or distally off an upper molar or bicuspids to be used as a platform for axle attachment. The eyelets can rotate freely around the axle attachment to allow for mouth movement. They may be secured by a threaded screw to prevent lateral disengagement of the eyelet.

A Herbst appliance can enable an orthodontist to obtain predictable results in correction a Class II condition (retrusive mandible) by eliminating need for a great deal of patient cooperation. The degree of correction and rate of change can be controlled by the orthodontist when using such an appliance. In a removable form, a Herbst appliance can also be used to treat the growing needs of patients or to treat patients with sleep apnea. The vertical orientation allows for greater comfort and less protrusion into the lip. By advancing the mandible at night, the oropharynx of a patient may be opened up to allow the patient to breathe better while sleeping. Such an appliance may be used in some cases instead of a CPAP machine or even orthognathic surgery.

Herbst appliances are often used by an orthodontist to treat a Class II relationship involving a retruded or retrognathic mandible. Nearly half of all orthodontic patients seeking treatment have a Class II dental or skeletal position. A Herbst appliance can aid orthodontists seeking to treat their patients without the need for extractions. It is often used in an early orthopedic phase of treatment to align skeletal structures before the use of braces to secure alignment of the teeth and correcting occlusion issues.

When the mandible is in a more advanced position, skeletal remodeling occurs in a patient's condyle and eminence, facial musculature, and alveolar bone supporting the teeth. This combination of effects can allow for profile improvement, pleasing esthetic changes, more ideal positions of the teeth within the mouth and face, as well as create a more balanced musculo-skeletal function of the mandible. The advancement of the mandible also opens up the airway to relieve sleep apnea and snoring. These benefits have made Herbst appliances an orthodontic tool for many years. Herbst appliances using stainless steel construction allow the appliance to withstand the rigors of jaw movement including chewing, swallowing, night grinding, and speaking.

Many modifications have been made to the original Herbst appliance design over the past one hundred years in order to improve comfort, function, and practical use. Several such modifications are disclosed in the U.S. patents listed previously in this specification. A major weakness of previous Herbst appliances includes the restrictive nature of the appliance on a patient's jaw movement, particularly relating to lateral movement. For example, this restriction is caused when horizontal cylinders are attached to an upper arch of the patient (for example, in the molar area) and to the lower arch (for example, in the canine or first bicuspid area). In this type of arrangement, the horizontal cylinder length is limited by the patient's oral musculature.

A longer cylinder can improve a patient's lateral movement and also reduce breakage of the appliance, but tissue impingement can prevent use of a longer cylinder. In previous appliances, if the cylinder length were to be lengthened, tissue sores would occur within days of placement. When the horizontal cylinder was then shortened to accommodate room for the tissue, function of the appliance is restricted. This leads to appliance binding and increased occurrences of appliance breakage.

In order to apply a Herbst appliance, the upper arch needs to be expanded in relation to the lower arch in order for right and left sleeve and rod assembly to be attached. If not expanded significantly, restriction and binding does not allow the patient necessary freedom to move the lower jaw. Besides adding discomfort from not allowing the patient to close their mouth, the binding also escalates incidences of breakage. Due to this problem, many weeks or months have been spent in the past to widen the upper arch before attaching the Herbst arms.

Many Herbst appliance designs include a pivot barrel in a horizontal position. Such a design is restrictive to moving the mandible in horizontal directions. This restriction, combined with the tremendous force generated in some patients while chewing food, often results in appliance breakage.

In accordance with some embodiments, the problems of binding and breakage are addressed. In addition, early engagement of the appliance is simultaneously provided while tissue impingement is reduced. In some embodiments, this is accomplished using vertical cylinders rather than horizontal cylinders. Such an arrangement reduces the need for patient appointments, lessens treatment times, and improves comfort of the patient wearing the appliance. In some embodiments, a simplified attachment using vertical cylinders reduces overall cost compared with more complicated previous arrangements that use ball and socket designs or telescoping mechanisms.

Some embodiments relate to a Herbst orthodontic/orthopedic appliance having a connection between the upper and lower teeth for the purpose of improving an interarch relationship between the upper arch and the lower arch. In some embodiments, ends of rod/sleeve telescoping segments include openings (for example, openings such as eyelets) attached to cylinder-shaped pivots fixed by a screw. The cylinders may be longer than in traditional designs and may be placed vertically rather than as they were in previous designs (that is, rather than horizontally).

In some embodiments, including those illustrated in FIGS. 1-7 and described herein, due to a vertical orientation, a Herbst axle does not protrude into muscles of the cheek of a patient as in previous horizontal implementations, for example. This can reduce frequent sores in the mouth of the patient that are common with previous Herbst implementations due to rubbing of the pivot axle while eating and speaking. In addition, a vertical pivot orientation as illustrated and described herein is esthetically favorable due to elimination of the protrusion of the pivot axle into the cheek of the patient.

A vertical orientation as illustrated and described herein also allows for more lateral movement of the jaw, which reduces binding and breakage of the appliance. Further, due to the orientation of a vertical axle, the arms of the appliance can be attached in a manner that requires less expansion of the maxillary molars. This can allow for earlier attachment of the sleeve and rod and lead to a reduction of the time that a patient needs to wear the appliance. As a result, an appliance such as a Herbst appliance may include vertical pivot capabilities that allow the appliance to be used in younger patients due to less protrusion and muscle impingement found in smaller mouths. Further, orthopedic correction may be addressed earlier while the patient is still growing.

FIG. 1 illustrates an appliance 100 in accordance with some embodiments. In some embodiments, appliance 100 is a Herbst appliance, an orthodontic appliance, an orthopedic appliance, a sleep apnea appliance, and/or an orthodontic/orthopedic appliance.

Appliance 100 includes an upper crown 101 (or upper band 101), a screw 102, an upper arm sleeve 103, a lower crown 111 (or lower band 111), a screw 112, a base 113 (or lower arm 113), a modified lower arm 116, a shoe 118 (or base 118), and a cylinder 120. Upper crown 101 or upper band 101 is attached to an upper tooth of a patient (for example, attached to an upper molar of a patient) on one or both sides of the mouth of the patient. The screw 102 (for example, an axle screw) attaches upper arm sleeve 103 (for example, an upper Herbst arm sleeve) to the upper crown/ band 101. In some embodiments, screw 102 attaches to the upper crown/band 101 by extending through an opening (for example, an opening such as an eyelet) in the upper arm sleeve 103.

Lower crown 111 or lower band 111 is attached to a lower tooth of the patient (for example, attached to a lower molar of the patient) on one or both sides of the mouth of the patient. Screw 112 attaches base 113 or lower arm 113 (for example, a lower Herbst arm) to the lower crown/band 111 via a lower portion of the appliance 100 including modified lower arm 116, shoe 118 (or base 118), and cylinder 120. The lower arm 116 attaches the lower crown/band 111 to the shoe/base 118. In some embodiments, screw 112 extends through an opening (for example, an opening such as an eyelet) of lower arm 113 and screws into cylinder 120.

In some embodiments, sleeve 103 is a tube and lower arm 113 is a rod. In some embodiments, lower arm 113 is arranged as a telescoping barrel of lower arm 113 fitting in the upper arm sleeve 103. In some embodiments, lower arm 113 can slide inside sleeve 103 to slightly extend and retract within sleeve 103 based on movement of the mouth of the patient.

In some embodiments, the shoe/base 118 and the cylinder 120 are included in a pivot device, with the shoe/base 118 extending below the cylinder 120 in the form of a saddle. In some embodiments, the opening (for example, an eyelet) in lower arm 113 is wide enough to fit over the cylinder 120. In some embodiments, dimensions of the opening (for example, an eyelet) allow it to rotate freely around cylinder 120.

Cylinder 120 may be a female cylinder end of the device, with screw 112 extending through an opening (for example, an eyelet) of the lower arm 113 and attaching to the pivot device by screwing into an inside portion of cylinder 120. In some embodiments, a barrel of cylinder 120 may extend from the top of the screw tap down to the shoe/base 118 and/or to the lower arm/base 116. The pivot device including shoe/base 118 and cylinder 120 may be brazed or soldered to base/arm 116, which extends forward in a lower arch of the patient (for example, from the molar area of the mouth of the patient). The top end of the cylinder 120 may be capped with screw 112, which may be a locking threaded screw. In some embodiments, screw 112 may include a recessed socket to receive a wrench such as an Allen wrench. Alternatively, screw 112 may have a recessed screwdriver slot. In addition, screw 112 may include recessed Phillips, Roberson, or Torx sockets.

Cylinder 120 may be an elongated, vertically positioned cylinder head placed in the lower arch of the patient. The pivot arrangement including shoe/base 118 and cylinder 120 may be placed in the lower arch of a patient in the canine or first bicuspid (also known as, first bi) area, or may be placed in the molar area. In addition, in some embodiments, a similar pivot device including shoe/base 118 and cylinder 120 may be vertically positioned in the upper arch of a patient (for example, in the upper arch at a molar or posterior area). In some embodiments, pivot devices including shoe/base 118 and cylinder 120 may be vertically positioned in both the lower and upper arches on one or both sides of a patient's mouth.

In some embodiments, the cylinder 120 may allow for a tall arrangement allowing a large vertical spacing without much horizontal movement. For example, in some embodiments, a height of cylinder 120 may be in a range of 5 mm to 6 mm. This allows greater height than a traditional arrangement which allows much less vertical spacing. In addition, the vertical orientation of the axle connection of embodiments such as those illustrated in FIG. 1 allows for less restriction and greater movement of a patient's mandible. As a result, increases in patient comfort and mobility may be provided. In addition, a decrease in the chance of breakages and/or in the number of required orthodontist visits are likely.

Figure 2:
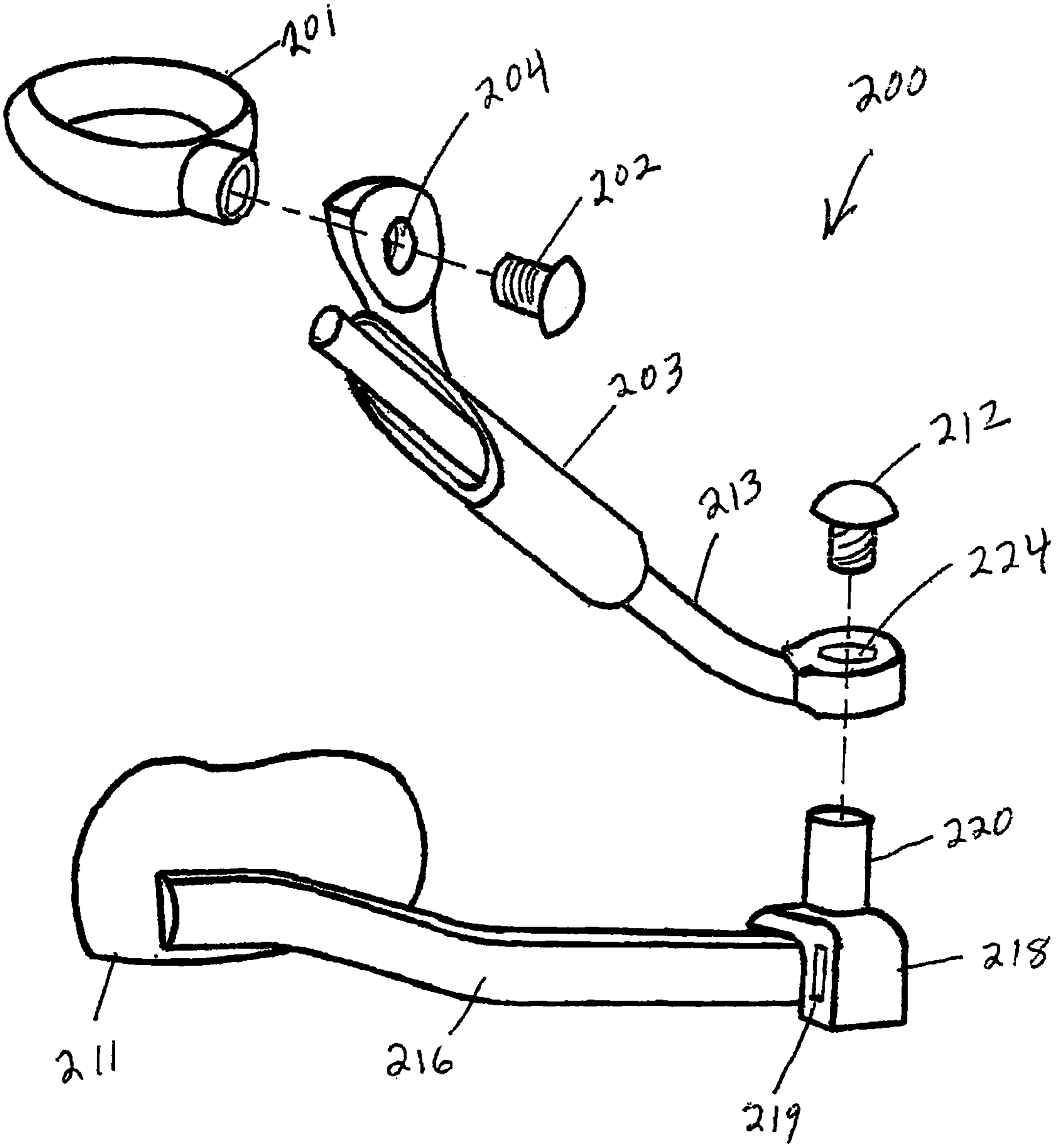
FIG. 2 illustrates an appliance in accordance with some embodiments.

FIG. 2 illustrates an appliance 200 in accordance with some embodiments. In some embodiments, appliance 200 is the same appliance and/or a similar appliance as appliance 100 of FIG. 1. In some embodiments, appliance 200 is a Herbst appliance, an orthodontic appliance, an orthopedic appliance, and/or an orthodontic/orthopedic appliance.

Appliance 200 includes an upper crown 201 (or upper band 201), a screw 202, an upper arm sleeve 203, an opening 204 (for example, an opening such as an eyelet), a lower crown 211 (or lower band 211), a screw 212, a lower arm 213, a modified lower arm 216, a shoe 218 (or base 218), an opening 219 (or arch wire slot 219), a cylinder 220, and an opening 224 (for example, an opening such as an eyelet). Upper crown 201 or upper band 201 is attached to an upper tooth of a patient (for example, attached to an upper molar of a patient) on one or both sides of the mouth of the patient. Screw 202 (for example, an axle screw) attaches upper arm sleeve 203 (for example, an upper Herbst arm sleeve) to the upper crown/band 201. In some embodiments, screw 202 attaches to the upper crown/band 201 by extending through the opening 204 (for example, an eyelet) in the upper arm sleeve 203.

Lower crown 211 or lower band 211 is attached to a lower tooth of the patient (for example, attached to a lower molar of the patient) on one or both sides of the mouth of the patient. Screw 212 attaches base 213 or lower arm 213 (for example, a lower Herbst arm) to the lower crown/band 211 via a lower portion of the appliance 200 including modified lower arm 216, shoe 218 (or base 218), and cylinder 220. The lower arm 216 attaches the lower crown/band 211 to the shoe/base 218. In some embodiments, screw 212 extends through the opening 224 (for example, an eyelet) of lower arm 213 and screws into cylinder 220. In some embodiments, opening 219 (or arch wire slot 219) is included in shoe/base 218. Opening/arch wire slot 219 may be an opening/slot in a lateral or buccal aspect, for example. Opening/slot 219 may be used to secure an arch wire for teeth alignment.

In some embodiments, sleeve 203 is a tube and lower arm 213 is a rod. In some embodiments, lower arm 213 is arranged as a telescoping barrel of lower arm 213 fitting in the upper arm sleeve 203. In some embodiments, lower arm 213 can slide inside sleeve 203 to slightly extend and retract within sleeve 203 based on movement of the mouth of the patient.

In some embodiments, the shoe/base 218 and the cylinder 220 are included in a pivot device, with the shoe/base 218 extending below the cylinder 220 in the form of a saddle. In some embodiments, the opening 224 (for example, an eyelet) in lower arm 213 is wide enough to fit over the cylinder 220. In some embodiments, dimensions of the opening 224 (for example, an eyelet) allow it to rotate freely around cylinder 220.

Cylinder 220 may be a female cylinder end of the device, with screw 212 extending through opening 224 (for example, an opening such as an eyelet) of the lower arm 213 and attaching to the pivot device by screwing into an inside portion of cylinder 220. In some embodiments, a barrel of cylinder 220 may extend from the top of the screw tap down to the shoe/base 218 and/or to the lower arm/base 216. The pivot device including shoe/base 218 and cylinder 220 may be brazed or soldered to base/arm 216, which extends forward in a lower arch of the patient (for example, from the molar area of the mouth of the patient). The top end of the cylinder 220 may be capped with screw 212, which may be a locking threaded screw. In some embodiments, screw 212 may include a recessed socket to receive a wrench such as an Allen wrench. Alternatively, screw 212 may have a recessed screwdriver slot. In addition, screw 212 may include recessed Phillips, Roberson, or Torx sockets.

Cylinder 220 may be an elongated, vertically positioned cylinder head placed in the lower arch of the patient. The pivot arrangement including shoe/base 218 and cylinder 220 may be placed in the lower arch of a patient in the canine or first bicuspid (also known as, first bi) area, or may be placed in the molar area. In addition, in some embodiments, a similar pivot device including shoe/base 218 and cylinder 220 may be vertically positioned in the upper arch of a patient (for example, in the upper arch at a molar or posterior area). In some embodiments, pivot devices including shoe/base 218 and cylinder 220 may be vertically positioned in both the lower and upper arches on one or both sides of a patient's mouth.

In some embodiments, the cylinder 220 may allow for a tall arrangement allowing a large vertical spacing without much horizontal movement. For example, in some embodiments, a height of cylinder 220 may be in a range of 5 mm to 6 mm. This allows greater height than a traditional arrangement which allows much less vertical spacing. In addition, the vertical orientation of the axle connection of embodiments such as those illustrated in FIG. 2 allows for less restriction and greater movement of a patient's mandible. As a result, increases in patient comfort and mobility may be provided. In addition, a decrease in the chance of breakages and/or in the number of required orthodontist visits are likely.

Figure 3:
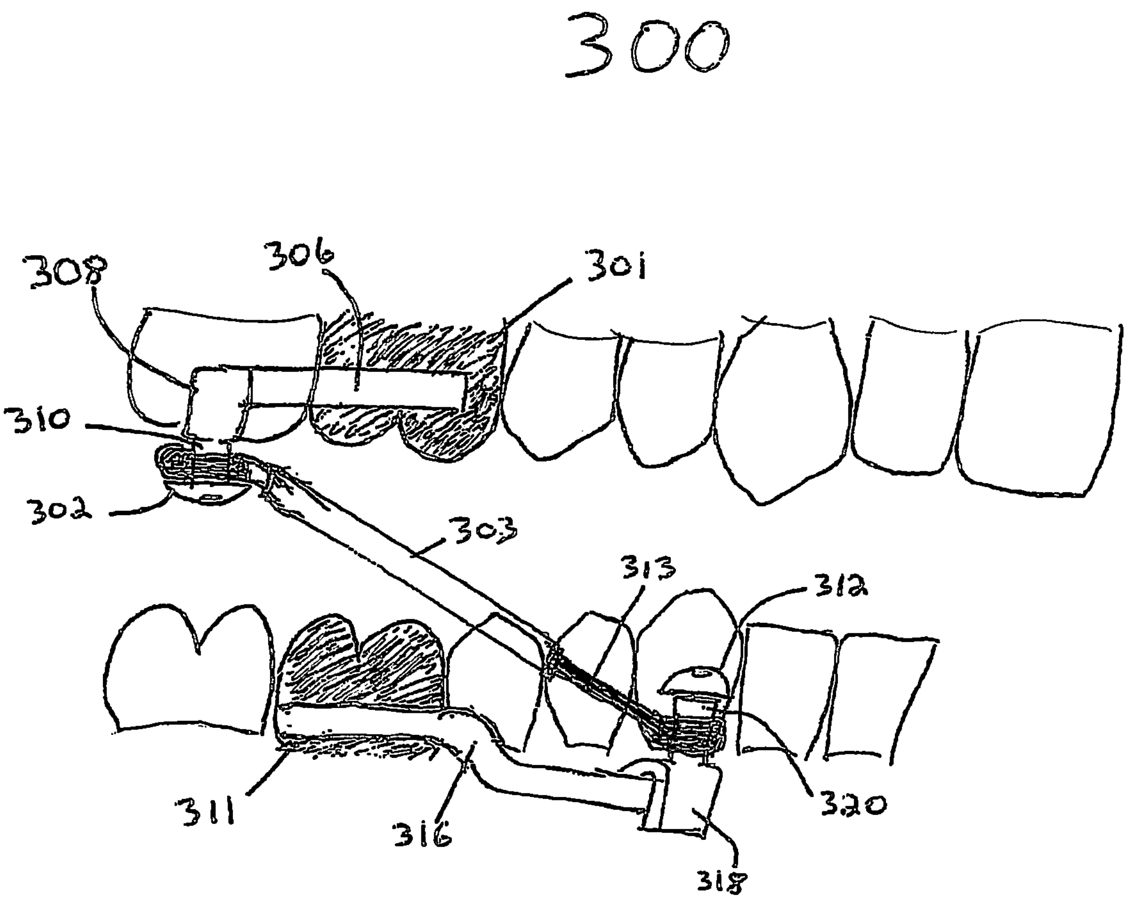
FIG. 3 illustrates an appliance in accordance with some embodiments.

FIG. 3 illustrates an appliance 300 in accordance with some embodiments. In some embodiments, appliance 300 is a Herbst appliance, an orthodontic appliance, an orthopedic appliance, and/or an orthodontic/orthopedic appliance. In accordance with some embodiments, appliance 300 includes pivot devices that may be vertically positioned in both the lower and upper arches on one or both sides of a patient's mouth. It is noted that FIG. 3 illustrates one side of the mouth of a patient. However, in accordance with some embodiments, an appliance such as appliance 300 may be positioned on both sides of the mouth of the patient.

Appliance 300 includes an upper crown 301 (or upper band 301), a screw 302, an upper arm sleeve 303, a modified upper arm 306, a shoe 308 (or base 308), a cylinder 310, a lower crown (or lower band 311), a screw 312, a base 313 (or lower arm 313), a modified lower arm 316, a shoe 318 (or base 318), and a cylinder 320.

Upper crown 301 or upper band 301 is attached to an upper tooth of a patient (for example, attached to an upper molar of a patient). Screw 302 (for example, an axle screw) attaches upper arm sleeve 303 (for example, an upper Herbst arm) to the upper crown/band 301 via an upper portion of the appliance 300 including modified upper arm 306, shoe 308 (or base 308), and cylinder 310. The upper arm 306 attaches the upper crown/band 301 to the shoe/base 308. In some embodiments, screw 302 extends through an opening (for example, an opening such as an eyelet) of upper arm 303 and screws into cylinder 310.

In some embodiments, the shoe/base 308 and the cylinder 310 are included in a pivot device, with the shoe/base 308 extending upward from the cylinder 310 in the form of a saddle. In some embodiments, the opening (for example, an eyelet) in upper arm 303 is wide enough to fit over the cylinder 310. In some embodiments, dimensions of the opening (for example, an eyelet) of upper arm 303 allow it to rotate freely around cylinder 310.

Cylinder 310 may be a female cylinder end of the device, with screw 302 extending through an opening (for example, an eyelet) of the upper arm 303 and attaching to the pivot device by screwing into an inside portion of cylinder 310. In some embodiments, a barrel of cylinder 310 may extend from the screw tap to the shoe/base 308 and/or to the lower arm/base 306. The pivot device including shoe/base 308 and cylinder 310 may be brazed or soldered to base/arm 306, which extends in an upper arch of the patient (for example, from the molar area of the mouth of the patient). An end of the cylinder 310 may be capped with screw 302, which may be a locking threaded screw. In some embodiments, screw 302 may include a recessed socket to receive a wrench such as an Allen wrench. Alternatively, screw 302 may have a recessed screwdriver slot. In addition, screw 302 may include recessed Phillips, Roberson, or Torx sockets.

Cylinder 310 may be an elongated, vertically positioned cylinder head placed in the upper arch of the patient. The pivot arrangement including shoe/base 308 and cylinder 310 may be placed in the upper arch of a patient (for example, in the molar area).

In some embodiments, the cylinder 310 may allow for a tall arrangement allowing a large vertical spacing without much horizontal movement. For example, in some embodiments, a height of cylinder 310 may be in a range of 5 mm to 6 mm. This allows greater height than a traditional arrangement which allows much less vertical spacing. In addition, the vertical orientation of the axle connection of embodiments such as those illustrated in FIG. 3 allows for less restriction and greater movement of a patient's mandible. As a result, increases in patient comfort and mobility may be provided. In addition, a decrease in the chance of breakages and/or in the number of required orthodontist visits are likely.

Lower crown 311 or lower band 311 is attached to a lower tooth of the patient (for example, attached to a lower molar of the patient) on one or both sides of the mouth of the patient. Screw 312 attaches base 313 or lower arm 313 (for example, a lower Herbst arm) to the lower crown/band 311 via a lower portion of the appliance 300 including modified lower arm 316, shoe 318 (or base 318), and cylinder 320. The lower arm 316 attaches the lower crown/band 311 to the shoe/base 318. In some embodiments, screw 312 extends through an opening (for example, an opening such as an eyelet) of lower arm 313 and screws into cylinder 320.

In some embodiments, sleeve 303 is a tube and lower arm 313 is a rod. In some embodiments, lower arm 313 is arranged as a telescoping barrel of lower arm 313 fitting in the upper arm sleeve 303. In some embodiments, lower arm 313 can slide inside sleeve 303 to slightly extend and retract within sleeve 303 based on movement of the mouth of the patient.

In some embodiments, the shoe/base 318 and the cylinder 320 are included in a pivot device, with the shoe/base 318 extending below the cylinder 320 in the form of a saddle. In some embodiments, the opening (for example, an eyelet) in lower arm 313 is wide enough to fit over the cylinder 320. In some embodiments, dimensions of the opening (for example, an eyelet) in lower arm 313 allow it to rotate freely around cylinder 320.

Cylinder 320 may be a female cylinder end of the device, with screw 312 extending through an opening (for example, an opening such as an eyelet) of the lower arm 313 and attaching to the pivot device by screwing into an inside portion of cylinder 320. In some embodiments, a barrel of cylinder 320 may extend from the top of the screw tap down to the shoe/base 318 and/or to the lower arm/base 316. The pivot device including shoe/base 318 and cylinder 320 may be brazed or soldered to base/arm 316, which extends forward in a lower arch of the patient (for example, from the molar area of the mouth of the patient). The top end of the cylinder 320 may be capped with screw 312, which may be a locking threaded screw. In some embodiments, screw 312 may include a recessed socket to receive a wrench such as an Allen wrench. Alternatively, screw 312 may have a recessed screwdriver slot. In addition, screw 312 may include recessed Phillips, Roberson, or Torx sockets.

Cylinder 320 may be an elongated, vertically positioned cylinder head placed in the lower arch of the patient. The pivot arrangement including shoe/base 318 and cylinder 320 may be placed in the lower arch of a patient in the canine or first bicuspid (also known as, first bi) area, or may be placed in the molar area.

In some embodiments, the cylinder 320 may allow for a tall arrangement allowing a large vertical spacing without much horizontal movement. For example, in some embodiments, a height of cylinder 320 may be in a range of 5 mm to 6 mm. This allows greater height than a traditional arrangement which allows much less vertical spacing. In addition, the vertical orientation of the axle connection of embodiments such as those illustrated in FIG. 3 allows for less restriction and greater movement of a patient's mandible. As a result, increases in patient comfort and mobility may be provided. In addition, a decrease in the chance of breakages and/or in the number of required orthodontist visits are likely.

Figure 4:
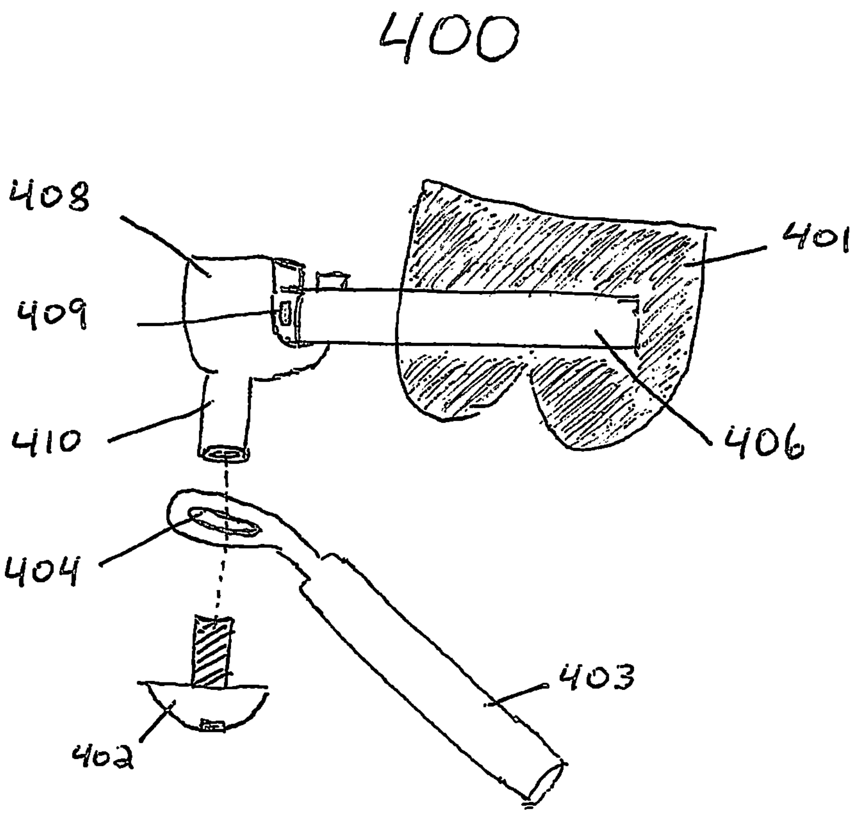
FIG. 4 illustrates an appliance in accordance with some embodiments.

FIG. 4 illustrates an appliance 400 in accordance with some embodiments. In some embodiments, appliance 400 is the same appliance and/or a similar appliance as appliance 300 of FIG. 3. In some embodiments, appliance 400 is an upper portion of the appliance 300 of FIG. 3. In some embodiments, appliance 400 is a Herbst appliance, an orthodontic appliance, an orthopedic appliance, and/or an orthodontic/orthopedic appliance.

Appliance 400 includes an upper crown 401 (or upper band 401), a screw 402, an upper arm sleeve 403, an opening 404 (for example, an opening such as an eyelet), a modified upper arm 406, a shoe 408 (or base 408), an opening 409 (or arch wire slot 409), and a cylinder 410. In some embodiments, upper crown 401 (or upper band 401), screw 402, upper arm sleeve 403, modified upper arm 406, shoe 408 (or base 408), and cylinder 410 of FIG. 4 are the same as and/or similar to upper crown 301 (or upper band 301), screw 302, upper arm sleeve 303, modified upper arm 306, shoe 308 (or base 308), and cylinder 310 of FIG. 3, respectively.

Upper crown 401 or upper band 401 is attached to an upper tooth of a patient (for example, attached to an upper molar of a patient). Screw 402 (for example, an axle screw) attaches upper arm sleeve 403 (for example, an upper Herbst arm sleeve) to the cylinder 410. In some embodiments, screw 402 attaches to the cylinder 410 by extending through the opening 404 (for example, an eyelet) in the upper arm sleeve 403.

Upper crown 401 or upper band 401 is attached to an upper tooth of the patient (for example, attached to an upper molar of the patient) on one or both sides of the mouth of the patient. Screw 402 attaches upper arm sleeve 403 (for example, an upper Herbst arm) to the upper crown/band 401 via modified upper arm 406, shoe 408 (or base 408), and cylinder 410. The upper arm 406 attaches the upper crown/band 401 to the shoe/base 408. In some embodiments, screw 402 extends through the opening 404 (for example, an eyelet) of upper arm sleeve 403 and screws into cylinder 410. In some embodiments, opening 409 (or arch wire slot 409) is included in shoe/base 408. Opening/arch wire slot 409 may be an opening/slot in a lateral or buccal aspect, for example. Opening/slot 409 may be used to secure an arch wire for teeth alignment.

In some embodiments, the shoe/base 408 and the cylinder 410 are included in a pivot device, with the shoe/base 408 extending above the cylinder 410 in the form of a saddle. In some embodiments, the opening 404 (for example, an eyelet) in upper arm sleeve 403 is wide enough to fit over the cylinder 410. In some embodiments, dimensions of the opening 404 (for example, an eyelet) allow it to rotate freely around cylinder 410.

Cylinder 410 may be a female cylinder end of the device, with screw 402 extending through the opening 404 (for example, an eyelet) of the upper arm sleeve 403 and attaching to the pivot device by screwing into an inside portion of cylinder 410. In some embodiments, a barrel of cylinder 410 may extend from the top of the screw tap to the shoe/base 408 and/or to the upper arm/base 406. The pivot device including shoe/base 408 and cylinder 410 may be brazed or soldered to base/arm 406, which extends in an upper arch of the patient (for example, from the molar area of the mouth of the patient). The bottom end of the cylinder 410 may be capped with screw 402, which may be a locking threaded screw. In some embodiments, screw 402 may include a recessed socket to receive a wrench such as an Allen wrench. Alternatively, screw 402 may have a recessed screwdriver slot. In addition, screw 402 may include recessed Phillips, Roberson, or Torx sockets.

Cylinder 410 may be an elongated, vertically positioned cylinder head placed in the upper arch of the patient. The pivot arrangement including shoe/base 408 and cylinder 410 may be placed in the upper arch of a patient, and may be placed in the molar area.

In some embodiments, the cylinder 410 may allow for a tall arrangement allowing a large vertical spacing without much horizontal movement. For example, in some embodiments, a height of cylinder 410 may be in a range of 5 mm to 6 mm. This allows greater height than a traditional arrangement which allows much less vertical spacing. In addition, the vertical orientation of the axle connection of embodiments such as those illustrated in FIG. 4 allows for less restriction and greater movement of a patient's mandible. As a result, increases in patient comfort and mobility may be provided. In addition, a decrease in the chance of breakages and/or in the number of required orthodontist visits are likely.

Figure 5:
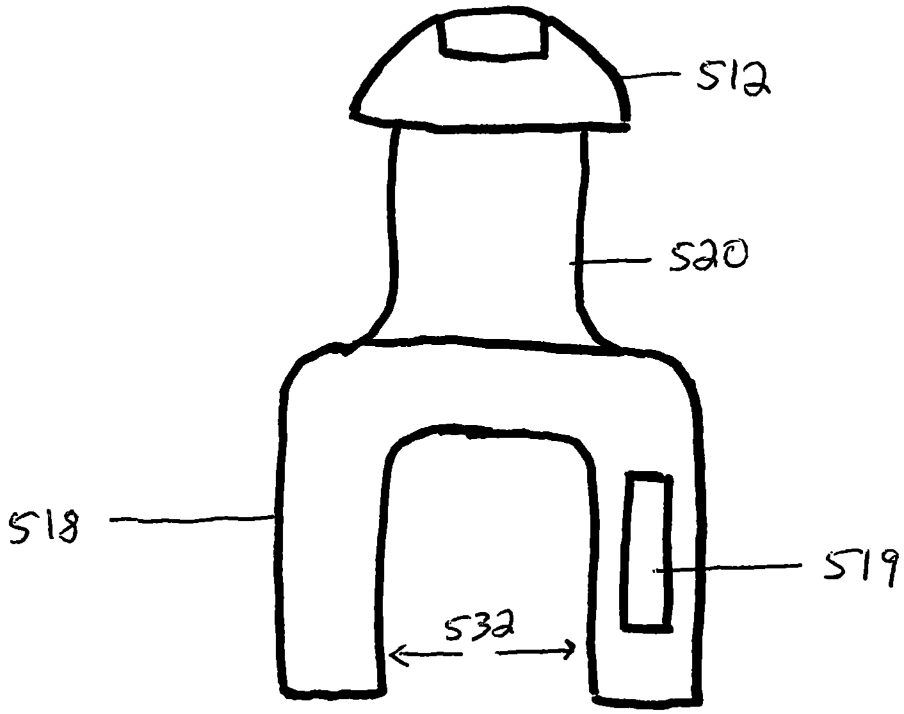
FIG. 5 illustrates a device in accordance with some embodiments.

FIG. 5 illustrates a device 500 (for example, a vertical pivot device) that may be used in an appliance to provide a vertical pivot connection in accordance with some embodiments. In some embodiments, device 500 is included in appliance 100 of FIG. 1, in appliance 200 in FIG. 2, in appliance 300 of FIG. 3, and/or in appliance 400 of FIG. 4. In some embodiments, device 500 is included in a Herbst appliance, in an orthodontic appliance, in an orthopedic appliance, and/or in an orthodontic/orthopedic appliance.

In some embodiments, pivot 500 includes a screw 512, a shoe 518 or base 518, an opening 519 or arch wire slot 519 in the shoe/base 518, and a cylinder 520. In some embodiments, screw 512, shoe 518 (or base 518), and cylinder 520 are the same as or similar to screw 112, shoe 118 (or base 118), and cylinder 120 of FIG. 1, respectively, and may be included in appliance 100 of FIG. 1. In some embodiments, screw 512, shoe 518 (or base 518), opening 519 (or arch wire slot 519), and cylinder 520 are the same as or similar to screw 212, shoe 218 (or base 218), opening 219 (or arch wire slot 219), and cylinder 220 of FIG. 2, respectively, and may be included in appliance 200 of FIG. 2. In some embodiments, screw 512, shoe 518 (or base 518), and cylinder 520 are the same as or similar to screw 312, shoe 318 (or base 318), and cylinder 320 of FIG. 3, respectively, and may be included in appliance 300 of FIG. 3. In some embodiments, screw 512, shoe 518 (or base 518), and cylinder 520 are the same as or similar to screw 302, shoe 308 (or base 308), and cylinder 310 of FIG. 3, respectively, and may be included in appliance 300 of FIG. 3. In some embodiments, screw 512, shoe 518 (or base 518), opening 519 (or arch wire slot 519), and cylinder 520 are the same as or similar to screw 402, shoe 408 (or base 408), opening 409 (or arch wire slot 409), and cylinder 410 of FIG. 4, respectively, and may be included in appliance 400 of FIG. 4.

In some embodiments, the shoe/base 518 may be attached to a lower arm such as lower arm 116 of FIG. 1, lower arm 216 of FIG. 2, and/or lower arm 316 of FIG. 3. In some embodiments, the shoe/base 518 may be attached to an upper arm such as upper arm 306 of FIG. 3 and/or upper arm 406 of FIG. 4.

In some embodiments, screw 512 extends through an opening (for example, an opening such as an eyelet) of a lower arm such as lower arm 113 of FIG. 1, lower arm 213 of FIG. 2, and/or lower arm 313 of FIG. 3, and/or through an opening (for example, an opening such as an eyelet) of an upper arm such as upper arm 306 of FIG. 3 and/or upper arm 406 of FIG. 4. In some embodiments, screw 512 screws into cylinder 520. In some embodiments, opening/arch wire slot 519 may be an opening/slot in a lateral or buccal aspect, for example. Opening/slot 519 may be used to secure an arch wire for teeth alignment.

In some embodiments, as illustrated in FIG. 5, the shoe/base 518 extends from the cylinder 520 in the form of a saddle. In some embodiments, an opening (for example, an opening such as opening 224 or opening 404) in a lower arm or an upper arm (for example, a lower arm such as lower arm 113 of FIG. 1, lower arm 213 of FIG. 2, lower arm 313 of FIG. 3, upper arm 303 of FIG. 3, and/or upper arm 403 of FIG. 4) is wide enough to fit over the cylinder 520. In some embodiments, dimensions of the opening allow it to rotate freely around cylinder 520.

Cylinder 520 may include a female cylinder end, with screw 512 extending through an opening (for example, an opening such as an eyelet) of a lower arm or an upper arm (such as lower arm 113 of FIG. 1, lower arm 213 of FIG. 2, lower arm 313 of FIG. 3, upper arm 303 of FIG. 3, and/or upper arm 403 of FIG. 4) by screwing into an inside portion of cylinder 520. In some embodiments, a barrel of cylinder 520 may extend from the top of the screw tap down to the shoe/base 518. The pivot device 500 may be brazed or soldered to a base/arm (for example, to base/arm 116 of FIG. 1 or to base/arm 216 of FIG. 2), which extends forward in a lower arch of a patient (for example, from the molar area of the mouth of the patient). The top end of the cylinder 520 may be capped with screw 512, which may be a locking threaded screw. In some embodiments, screw 512 may include a recessed socket to receive a wrench such as an Allen wrench. Alternatively, screw 512 may have a recessed screwdriver slot. In addition, screw 512 may include recessed Phillips, Roberson, or Torx sockets.

Cylinder 520 may be an elongated, vertically positioned cylinder head placed in the lower arch of the patient. The pivot arrangement including shoe/base 518 and cylinder 520 may be placed in the lower arch of a patient in the canine or first bicuspid (also known as, first bi) area, or may be placed in the molar area. In addition, in some embodiments, a similar pivot device including shoe/base 518 and cylinder 520 may be vertically positioned in the upper arch of a patient (for example, in the upper arch at a molar or posterior area). In some embodiments, pivot devices including shoe/base 518 and cylinder 520 may be vertically positioned in both the lower and upper arches on one or both sides of a patient's mouth.

In some embodiments, the cylinder 520 may allow for a tall arrangement allowing a large vertical spacing without much horizontal movement. For example, in some embodiments, a height of cylinder 520 may be in a range of 5 mm to 6 mm. This allows greater height than a traditional arrangement which allows much less vertical spacing. In addition, the vertical orientation of the device 500 of embodiments such as those illustrated in FIG. 5 allows for less restriction and greater movement of a patient's mandible. As a result, increases in patient comfort and mobility may be provided. In addition, a decrease in the chance of breakages and/or in the number of required orthodontist visits are likely.

In some embodiments, device 500 of FIG. 5 includes a saddle shape (for example, the saddle shape of shoe/base 518). The device 500 may be attached to a lower cantilevered arm or an upper cantilevered arm by solder or laser weld, and/or may be attached to an opening (such as a Herbst arm eyelet) using a mushroom topped screw (for example, using screw 512 in embodiments in which screw 512 is a mushroom topped screw). In some embodiments, opening/slot 519 may be an opening or arch wire slot in a lateral or buccal aspect to secure an arch wire for teeth alignment. In some embodiments, cylinder 520 may be an elongated shaft (for example, an elongated shaft that is approximately 5 mm long, and/or an elongated shaft that is approximated 5 mm to 6 mm long) in which an opening (for example, an opening such as an eyelet) may surround cylinder 520 and be secured by screw 512. In some embodiments, device 500 may be included in a lower section of a Herbst appliance (for example, in the lower arch area of the mouth of a patient). In some embodiments, device 500 may be included in an upper section of a Herbst appliance (for example, in the upper arch area of the mouth of a patient). In some embodiments, device 500 may be used off of a cantilever arrangement (for example, a cantilever arrangement in the upper arch area of the mouth of a patient).

In some embodiments, shoe/base 518 may be brazed or soldered to a base or arm that extends forward or backward in a lower arch (or that extends forward or backward in an upper arch) of the mouth of a patient (for example, extends forward from the molar area of the mouth of the patient). In some embodiments, cylinder 520 includes a female cylinder end (for example, a female cylinder end of a vertical pivot such as a vertical Herbst pivot). In some embodiments, the female cylinder end of cylinder 520 includes screw threads on the inside of a barrel of the cylinder in order to accommodate screw 512. In some embodiments, cylinder 520 is an elongated vertically positioned cylinder head that may be placed in a mouth in a lower arch area near the canine tooth or first bicuspid (bi) area. Cylinder 520 may also be placed in the lower molar areas, in an upper arch at the molar or posterior area, or in both the lower and upper arches. The barrel of the cylinder 520 can extend from the attached base 518 to a top of the screw top. In this manner an opening (for example, an opening such as an eyelet) of a telescoping barrel or sleeve can fit over the cylinder 520. In some embodiments, an opening (for example, an opening such as an eyelet) can rotate freely around an outer portion of cylinder 520.

In some embodiments, the device 500 (including screw 512, or not including screw 512) may be a cast or molded piece fabricated out of surgical grade stainless steel, titanium, or other strong metal that is compatible with the environment in which it is to be placed (for example, compatible with an oral environment, and/or compatible with a bodily environment).

In some embodiments, shoe/base 518 is designed as a saddle-shaped base to straddle over an extending arm (for example, such as arm 116 of FIG. 1, arm 216 of FIG. 2, arm 316 of FIG. 3, arm 306 of FIG. 3, and/or arm 406 of FIG. 4). The extending arm may be soldered or brazen to a crown or band (for example, to a crown or band in a molar area, to a crown or band in a bicuspid (bi) area, to a crown or band such as crown/band 111 of FIG. 1, to a crown or band such as crown/band 211 of FIG. 2, to a crown or band such as crown/band 311 of FIG. 3, to a crown or band such as crown/band 301 of FIG. 3, and/or to a crown or band such as crown/band 401 of FIG. 4). In some embodiments, shoe/base 518 is designed as a saddle-shaped base that is soldered or brazen to such a forward or reverse extending arm in a vertical position above or below the forward or reverse extending arm.

In some embodiments, the opening/slot 519 is a round or rectangular hole. In some embodiments, the opening/slot 519 is on a buccal or lingual side of the shoe/base 518. In some embodiments, the opening/slot 519 may be used to receive an arch wire for orthodontia.

In some embodiments, cylinder 520 is an elongated and vertically placed cylinder or barrel. The inside of cylinder 520 may be threaded to receive a screw such as screw 512. Screw 512 may include a mushroom shaped hat with a recessed slot (for example, a hex or vertical slot). The outside of cylinder 520 (or barrel 520) may be designed to allow an opening (for example, an opening such as an eyelet) of an appliance arm (such as a Herbst appliance arm) to encompass and be held by screw 512.

In some embodiments, shoe/base 518 is formed in the shape of a saddle with an inner opening between two legs of the saddle (for example, where the inner opening is an open area to accommodate a forward extending arm). In some embodiments, a width 532 of the opening between the two legs of the saddle of shoe/base 518 is approximately 2.5 mm.

Figure 6:
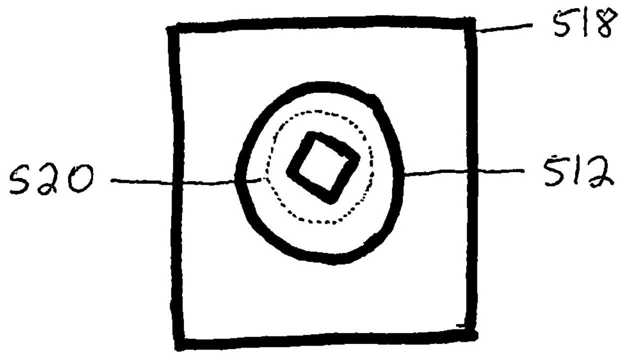
FIG. 6 illustrates the device of FIG. 5 from an overhead view (or top view) in accordance with some embodiments.

FIG. 6 illustrates device 500 of FIG. 5 from an overhead view, including screw 512, shoe/base 518, and cylinder 520. Cylinder 520 is shown in dotted lines in FIG. 6 to show that it extends below screw 512. In some embodiments, screw 512 extends within and may be screwed into cylinder 520 as described above. FIG. 6 illustrates an embodiment in which screw 512 includes a square recessed socket. However, other embodiments are contemplated. For example, in some embodiments, screw 512 includes a hexagonal recessed socket to receive an Allen wrench. In addition, device 500 can include other types of screws 512 in some embodiments.

Figure 7:
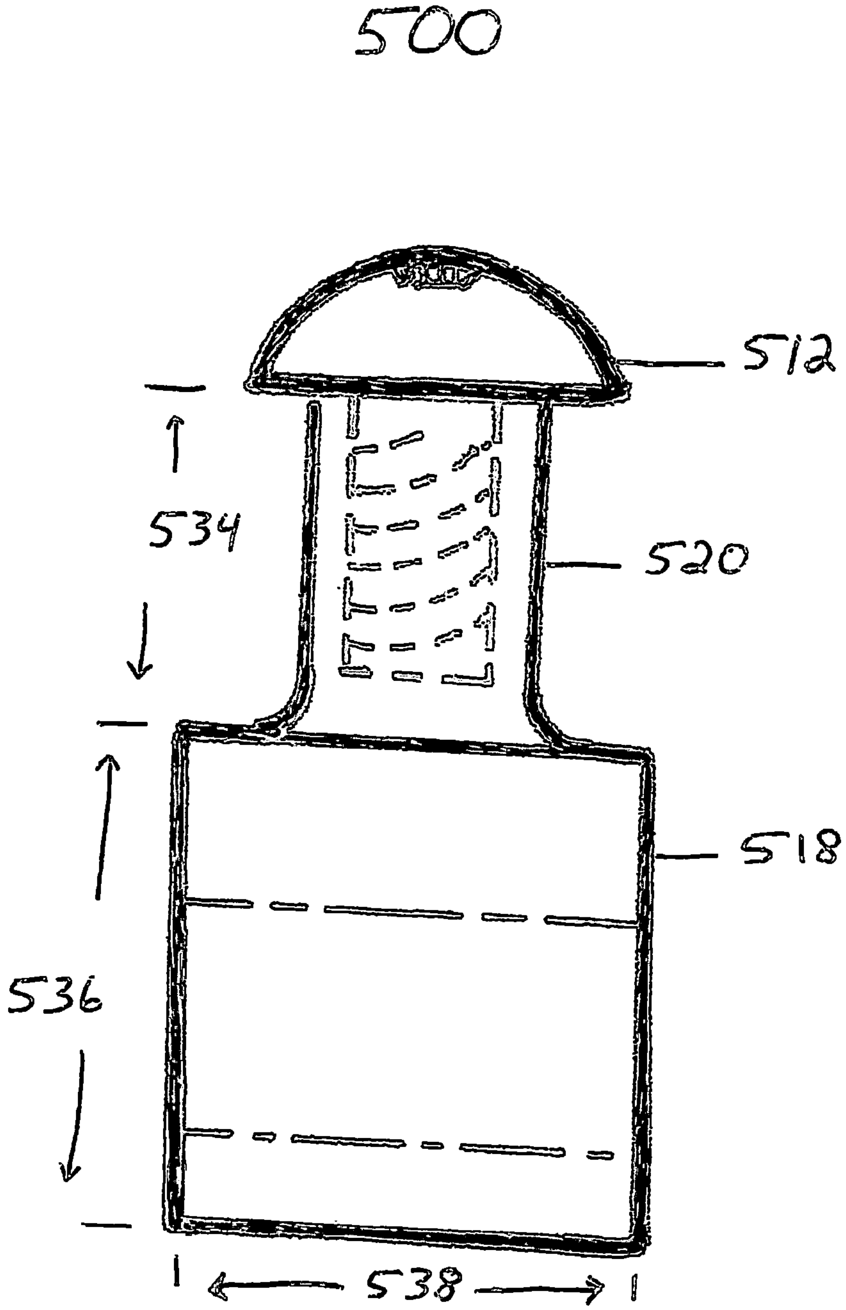
FIG. 7 illustrates the device of FIG. 5 from a different side view in accordance with some embodiments.

FIG. 7 illustrates device 500 of FIG. 5 from a different side view than that illustrated in FIG. 5, including screw 512, shoe/base 518, and cylinder 520. As shown in FIG. 7, screw 512 can include threads (shown in dotted lines in FIG. 7) that are screwed into cylinder 520. In some embodiments, a height 534 of cylinder 520 is approximately 5 mm. In some embodiments, a height 534 of cylinder 520 is in a range of approximately 5 mm to 6 mm. In some embodiments, a height 536 of shoe/base 518 is in a range of approximately 3 mm to 4 mm. In some embodiments, a width 538 of shoe/base 518 is in a range of approximately 3 mm to 4 mm.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1 In some examples, an apparatus includes an orthodontic housing enabling conversion of an appliance such as a Herbst appliance used in advancement of the mandible of a patient from a horizontal component to a vertical component. This vertical orientation allows for many advantages in the use of the appliance.

Example 2 In some examples, an orthodontic appliance includes one or more arms coupled between an upper arch of a patient and a lower arch of the patient, an eyelet in at least one of the one or more arms, a cylinder to be oriented in a vertical position in either the upper arch or the lower arch of the patient, a screw to hold the eyelet around the cylinder, wherein the screw is attachable to an inner portion of the cylinder, and a base formed in a saddle shape, the base to be attached to an arm to be secured to one or more teeth of the patient.

Example 3 In some examples, a device to be included in an orthodontic appliance includes a vertically oriented cylinder to accommodate an attachment to secure the cylinder to one or more arms extending between an upper arch and a lower arch of a patient, and a saddle-shaped base to be vertically oriented with the cylinder and shaped to fit with an element to be coupled to one or more teeth of the patient.

Example 4 In some examples, an adjustable Herbst orthodontic/orthopedic appliance includes a female cylinder end of a Herbst pivot that is soldered to a base or arm that extends forward in the lower arch to the molar area, capped with a locking thread screw, wherein the cylinder is casted or molded in surgical grade materials, at a height of 5 mm to 6 mm.

Example 5 In some examples, a cylinder head is positioned vertically in the lower arch near canine teeth or a first bicuspid area.

Example 6 In some examples, a saddle-shaped base component straddles over a forward extending arm that is soldered or brazen in a vertical position Example 7 In some examples, a saddle-shaped base component includes a buccal or lingual side of the base having a round or rectangular hole to receive an arch wire for orthodontia.

Example 8 In some examples, an apparatus includes a top half including an elongated vertical cylinder threaded to receive a screw with a mushroom shaped hat and a recessed slot.

Example 9 includes the subject matter of any of examples 1-8, with some or all portions of any of those examples being combined with some or all portions of any combination of any others of examples 1-8.

Example 10 In some examples, an orthodontic apparatus includes an arm to extend in a mouth of a patient, an opening formed in the arm, a cylinder, and a device to hold the cylinder in the opening in a manner that the cylinder is to be in a vertical position in an arch of the mouth of the patient.

Example 11 includes the subject matter of example 10, wherein the arch is a lower arch in the mouth of the patient.

Example 12 includes the subject matter of example 10, wherein the arch is an upper arch in the mouth of the patient.

Example 13 includes the subject matter of example 11, including a second opening formed in the arm or formed in a second arm, a second cylinder, and a device to hold the second cylinder in the second opening in a manner that the second cylinder is to be in a vertical position in an upper arch of the mouth of the patient.

Example 14 includes the subject matter of any of examples 10-13, wherein the device to hold the opening around the cylinder is a screw.

Example 15 includes the subject matter of examples 10-14, including a base formed with the cylinder.

Example 16 includes the subject matter of example 15, wherein the base is a saddle shaped base.

Example 17 includes the subject matter of example 15, wherein the base is vertically oriented and is attachable to one or more teeth of the patient.

Example 18 includes the subject matter of example 15, wherein the base straddles over a forward extending arm.

Example 19 includes the subject matter of example 15, wherein the base includes a hole to receive an arch wire for orthodontia.

Example 20 includes the subject matter of example 19, wherein the hole is in a round or rectangular shape.

Example 21 includes the subject matter of any of examples 10-20, wherein the cylinder and/or the second cylinder is casted or molded in surgical grade materials.

Example 22 includes the subject matter of any of examples 10-21, wherein the cylinder and/or the second cylinder has a height in a range of 5 mm to 6 mm.

Example 23 includes the subject matter of any of examples 10-22, wherein the cylinder is positioned vertically in a lower arch of the mouth of the patient near canine teeth or a first bicuspid area.

Example 24 includes the subject matter of any of examples 10-23, wherein the arm and/or the second arm is extendable and retractable based on movement of the mouth of the patient.

Example 25 A method of installing an orthodontic device, including extending an arm in a mouth of a patient, wherein the arm includes an opening formed therein, positioning a cylinder in a vertical position in an arch in the mouth of the patient, and securing a device to the cylinder to hold the eyelet around the cylinder.

Example 26 includes the subject matter of example 25, wherein the arch is a lower arch in the mouth of the patient.

Example 27 includes the subject matter of example 25, wherein the arch is an upper arch in the mouth of the patient.

Example 28 includes the subject matter of example 26, including positioning a second cylinder in a vertical position in an upper arch in the mouth of the patient using a second opening formed in the arm or in a second arm, and securing a device to the second cylinder to hold the second opening around the second cylinder.

Example 29 includes the subject matter of any of examples 25-28, wherein the arm and/or the second arm is extendable and retractable based on movement of the mouth of the patient.

Example 30 includes the subject matter of any of examples 1-29, with some or all portions of any of those examples being combined with some or all portions of any combination of any others of examples 1-29.

Although example embodiments and examples of the disclosed subject matter are described with reference to block diagrams and other diagrams in the drawings, persons of ordinary skill in the art will readily appreciate that many other ways of implementing the disclosed subject matter may alternatively be used. For example, the arrangements of the elements in the diagrams may be changed, eliminated, or combined. Any elements as illustrated or described may be changed, eliminated, or combined in accordance with some embodiments and examples.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure.

What is claimed is:

1. An orthodontic apparatus comprising:

an arm configured to extend in a mouth of a patient, the arm comprising a sleeve and a rod;

an opening formed in a first end of the arm;

a cylinder;

a base extending from the cylinder in the form of a saddle, the base further comprising a hole configured to receive an archwire for orthodontia;

an extending arm attachable to a tooth in an arch of the mouth of the patient; such that the base straddles the extending arm; and a screw retaining the opening of the arm on the cylinder such that when the base straddles the extending arm, the cylinder extends in a coronal apical direction.

2. The orthopedic apparatus of claim 1, wherein the arch is a lower arch in the mouth of the patient.

3. The orthopedic apparatus of claim 2, further comprising:

a second opening formed in a second end of the arm;

a second cylinder; and a second screw retaining the second opening on the arm on the second cylinder such that when the second cylinder is in the mouth the second cylinder is configured to be connected to an upper arch of the mouth of the patient and extend in a coronal apical direction.

4. The orthopedic apparatus of claim 1, wherein the arch is an upper arch in the mouth of the patient.

5. The orthopedic apparatus of claim 1, wherein the screw is a locking screw.

6. The orthopedic apparatus of claim 1, wherein the hole is in a round or rectangular shape.

7. The orthopedic apparatus of claim 1, wherein the cylinder is casted or molded in surgical grade materials.

8. The orthopedic apparatus of claim 1, wherein the cylinder has a height in a range of 5 mm to 6 mm.

9. The orthopedic apparatus of claim 1, wherein, when the arch is a lower arch, the cylinder is configured to extend in the coronal apical direction near canine teeth or a first bicuspid area.

10. The orthopedic apparatus of claim 1, wherein the arm is extendable and retractable based on movement of the mouth of the patient.

11. A method of installing the orthodontic apparatus of claim 1, the method comprising:

attaching the extending arm to a tooth in the arch of the mouth of the patient, straddling the base on the extending arm so that the cylinder extends in the coronal apical direction in the arch in the mouth of the patient; and securing the screw to the cylinder to hold the opening of the arm around the cylinder.

12. The method of claim 11, wherein the arch is a lower arch in the mouth of the patient.

13. The method of claim 11, comprising:

positioning a second cylinder such that it extends in a coronal apical direction in an upper arch in the mouth of the patient using a second opening formed in a second end of the arm; and securing a second screw to the second cylinder to hold the second opening around the second cylinder.

14. The method of claim 11, wherein the arch is an upper arch in the mouth of the patient.

15. The method of claim 11, wherein the arm is extendable and retractable based on movement of the mouth of the patient.

* * * * *